E. A. LINDSLEY.
APPARATUS FOR TREATING POLES OR OTHER WOODEN ARTICLES.
APPLICATION FILED JUNE 26, 1916.
1,223,890.  Patented Apr. 24, 1917.
3 SHEETS—SHEET 1.
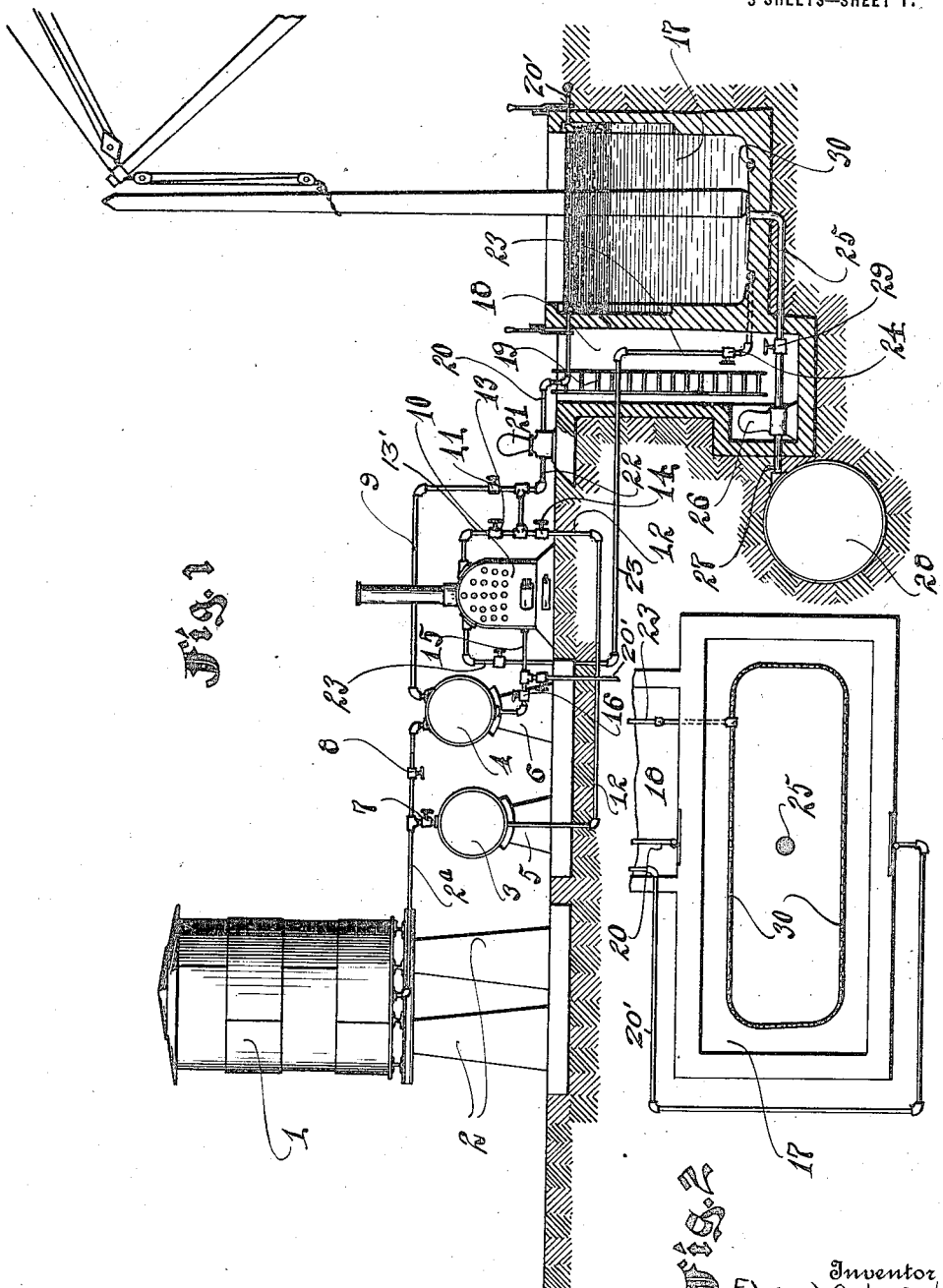
Inventor
Edward A. Lindsley
By
Herbert E. Smith
Attorney

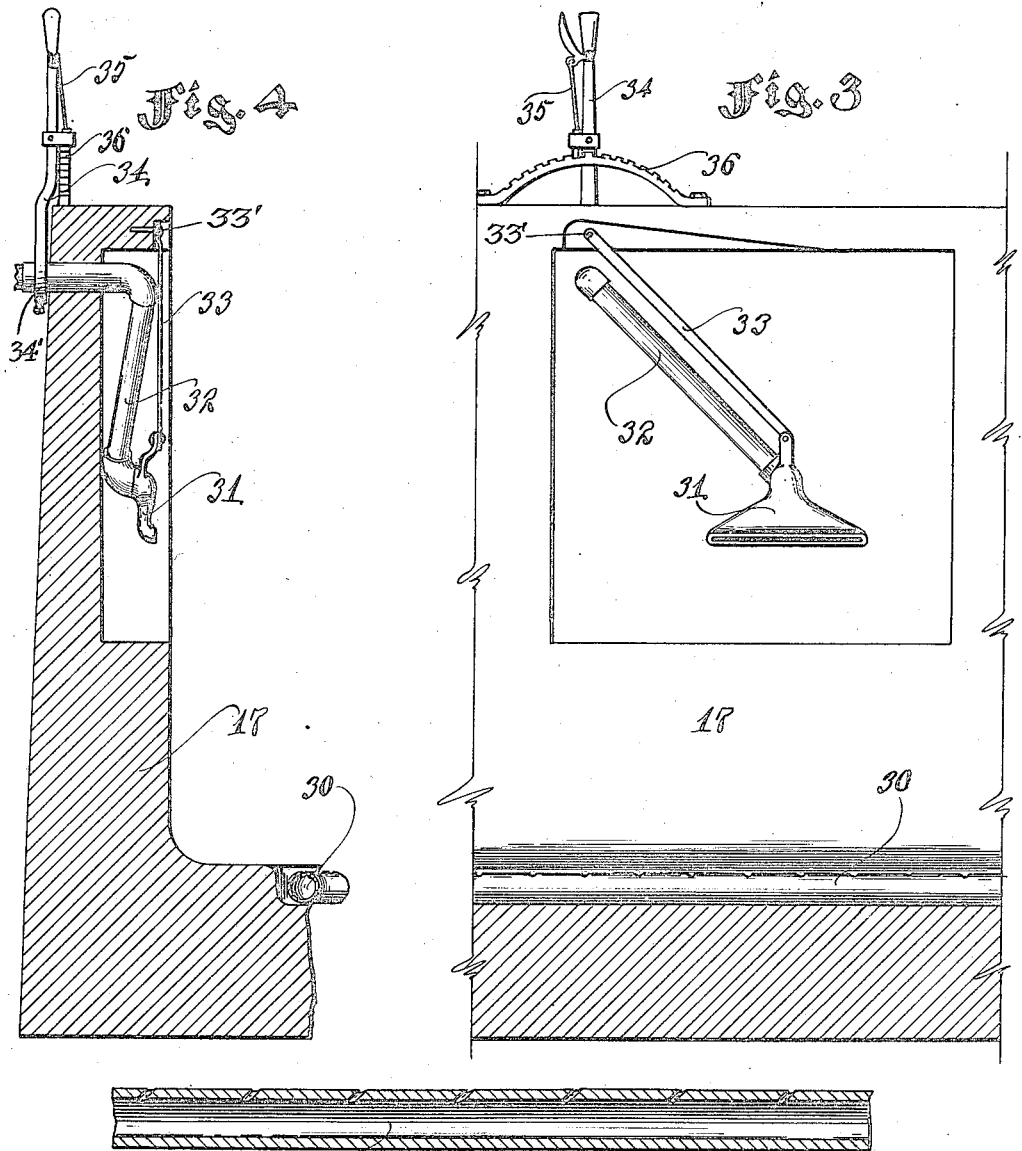

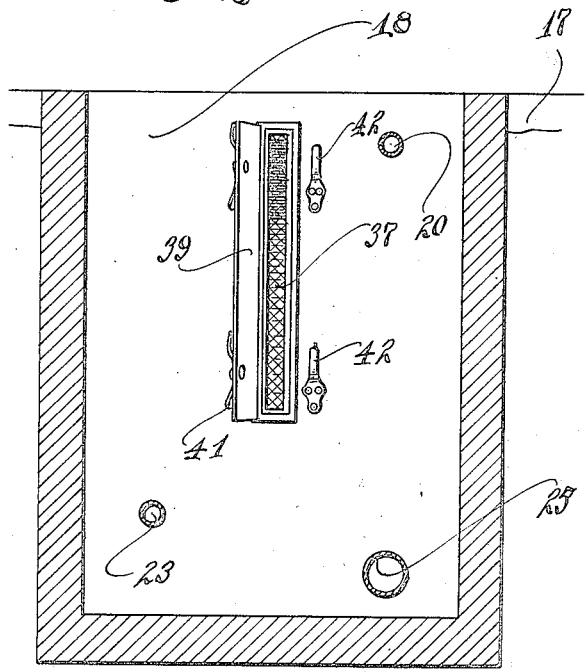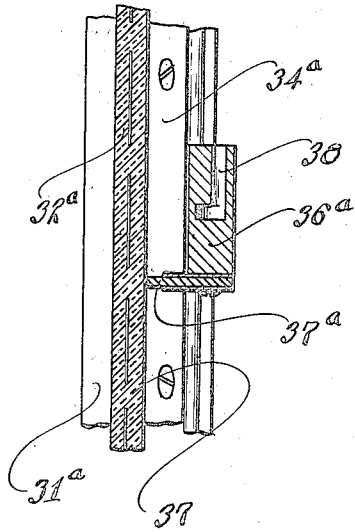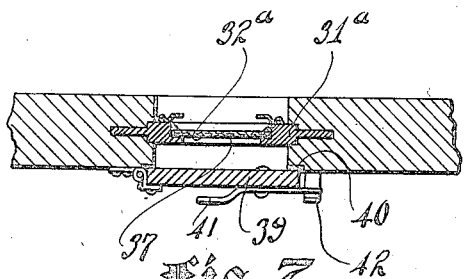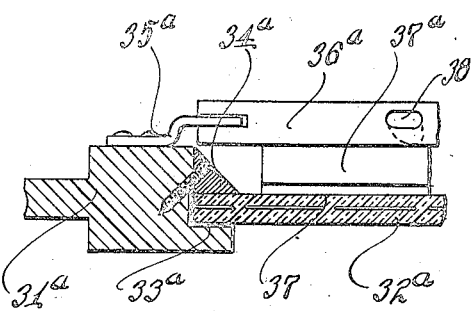

UNITED STATES PATENT OFFICE.

EDWARD A. LINDSLEY, OF SPOKANE, WASHINGTON.

APPARATUS FOR TREATING POLES OR OTHER WOODEN ARTICLES.

1,223,890.  Specification of Letters Patent.  Patented Apr. 24, 1917.

Application filed June 26, 1916. Serial No. 105,993.

*To all whom it may concern:*

Be it known that I, EDWARD A. LINDSLEY, a citizen of the United States, residing at Spokane, in the county of Spokane and State of Washington, have invented certain new and useful Improvements in Apparatus for Treating Poles or other Wooden Articles, of which the following is a specification.

This invention relates to improvements in what may be termed plants or apparatus for treating or impregnating poles or other wooden articles at an intermediary point especially with respect to, or above and below what is commonly indicated as the ground-line; telephone and telegraph poles are also intended to be similarly treated wherein the ground-line may vary from three and a half feet to seven and a half feet from the pole-end; also poles, piling and such like, may be treated wherein the ground-line or water-line, as the case may be, may be subjected to considerably more variance than the above indicated variances.

The invention has for its object to provide for carrying out the aforesaid ends with facility, expedition and effectiveness.

As will be appreciated from the following explanation of the purpose of this invention, it is noted that the particular design is to provide for the treatment of the article or object to a solution which may or may not be preservative but which has a greater specific gravity than the preservative as the fluids or oils that will be used to impregnate the pole above and below the ground line. An important feature of my invention lies in providing a plant or apparatus which will be capable of treating the poles at the desired point and with a belt of creosote or other preservative suitably applied thereto both above and below the common ground line. It is intended also that this plant or apparatus be capable of treating with hot solutions with means for agitating and thoroughly mixing the heavier specific gravity liquids, of heating the same to a desired point or degree, and of heating the main preservative or creosote and maintaining the same at the desired heat by a constant circulation of the creosote or preservative substance from the container or tank through a heater and back into the tank; it is also desired to maintain a constantly heated fluid in a container through the agency of steam pipes or otherwise.

The next step after the pole has been treated in heated liquids is to remove the lighter preservative or creosote, withdraw this liquid or solution from its container and remove the pole, and by this means prevent loss or waste of the expensive creosote or lighter preservative that would stick or adhere to the butt of the pole as it is withdrawn from the container or tank. It has been found by extensive experiment that it is possible to float the lighter preservative liquid or agent upon the heavier liquid without any intermingling, but it is necessary to flow the lighter liquid as evenly and gently upon the top of the heavy liquid as possible, and in drawing the liquid off it is necessary to have some means of outlet that can be maintained at the very bottom of the lighter liquid, or at the line between the two. It is further necessary to discover the point between the two liquids and, as under different weather conditions and in different treatments, a variable quantity of both liquids will be absorbed in the poles under treatment. This will alter the depth of the several liquid contents of the container or tank and will also vary when the posts are in the container and after they have been removed therefrom. In order to have a full knowledge at all times of the depth of the liquid contents it is necessary to provide a transparent gage in conducting such treatment of the poles or posts so that the operator will be able at any time to ascertain the various depths of the contents and to be able to draw off, or to supply fresh material at the proper depths which may be required to meet certain definite methods of treatment.

It is also very necessary to provide a plant or apparatus of the type contemplated by my invention wherein first a hot treatment extending from a few minutes to four or five hours may be given, then withdrawing the lighter or main preservative liquid and applying what is known as the cold bath which acts to chill the poles treated and cause contraction of the wood pores or cells during which contraction a portion of the cold bath liquid will penetrate and be absorbed by the wood. This contraction serves also to "set" the preservative. It will also be clearly borne in mind that the treatment has to do specifically with means wherein no pressure is used or is necessary. Other types of devices depend almost wholly upon treating in air-tight compartments or containers through vacuum or through pressure applied in said compartments during the process of treatment, whereas the method I employ is what may be termed the open or non-pressure treatment.

The invention consists of the instrumentalities and features of construction substantially as hereinafter fully disclosed and specifically pointed out in the appended claims.

In the accompanying drawings is illustrated the preferred embodiment of my invention wherein it will be understood that various changes and modifications may be made as to the detailed construction and arrangement of parts without departing from the scope of the claims, and in which drawings—

Figure 1 is a view mostly in general elevation and partly in vertical section, of my invention.

Fig. 2 is a horizontal or plan view of the treating tank, adjunctive parts being shown fragmentally.

Fig. 3 is an enlarged detailed view in elevation showing more particularly the device for delivering the lighter preservative liquid, as creosote, for instance, upon the heavier or lower grade material or preservative.

Fig. 4 is a partly sectional and edge view of the parts shown in Fig. 3.

Fig. 5 is a detailed sectional view showing the steam-inlet pipe in the bottom of the treating tank.

Fig. 6 is an enlarged vertical section taken through the well associated with the treating tank, showing more particularly the liquid gage applied to said tank.

Fig. 7 is a sectional view of said gage.

Fig. 8 is an enlarged horizontal detailed fragmental sectional view produced through Fig. 7 showing the gage wiper and method of mounting the gage glass, and Fig. 9 is also an enlarged vertical detailed fragmental sectional view showing the gage wiper.

Referring specifically to the drawings in which like reference characters are used to indicate like parts in the several views, the numeral 1 designates a preservative supply tank which is mounted upon supports 2 at a sufficient height. A pipe 2ª is adapted to convey the liquid from the tank to both reservoirs 3 and 4 which are supported at 5 and 6, respectively. Valves 7 and 8 control the passage of the preservative to the reservoirs.

In the pole treating operation, the butts of the poles are first positioned vertically in the tank 17 and the tank then filled to the desired point with the heavier cheaper preservative from a container 28 which is set in the ground below the level of the bottom of the treating tank 17, the top of the latter being preferably flush with the ground surface. The heavy preservative is forced into the tank through pipe 27 having a valve 29, by means of a pump 26. The lighter preservative is then introduced into the treating tank from reservoir 4 said preservative flowing by gravity from the reservoir to the tank through a pipe 15, boiler and heater 10, pipes 13', 20, 22, and the flowing device pipe 32, which device will be hereinafter described in detail.

When the proper amount of the lighter liquid, which is rendered hot by its passage through the heater 10, has thus been fed to the tank 17 the valve 16 is operated to close off the supply from the reservoir 4. To maintain a uniform temperature of the lighter preservative fluid a constant circulation of the same is secured through the medium of the flowing devices one of which is connected to a pipe 20' and the other to the pipe 20 as aforesaid. Pipe 20' (which is shown incomplete in Fig. 1) illustrated to better advantage in Fig. 2, provides connection from the other flowing device to pipe 15 leading into the heater 10, thus establishing a continuous circulation line consisting of pipes 20', 15, 13', 20, 22, the flowing devices, and through the heater 10. The pressure for maintaining the circulation is generated by a pump 21.

When the poles have been sufficiently subjected to the hot treatment the lighter fluid is drawn off into the tank 4 independently of the heavy preservative by the same pump 21, the passage being through one of the flowing devices and pipes 20, 22 and 9, the latter having a valve 11, to the tank.

Then follows admission of the cold bath liquid from the tank 3 through pipes 12, 20 and 22 and the flowing device connected to 20 by closing valves 11 and 13 and opening valve 14. Through this same line the cold bath liquid is returned to the tank 3 by action of the pump 21.

The heavy liquid may be drained from the treating tank into the container 28 through the pipe 25. In order to provide means for heating the heavy liquid and maintaining the same at the proper temperature a perforated pipe 30 is set into the floor of the tank 17 and connected up by a pipe 23 having a valve 24, with the heater and boiler 10 from which steam is admitted to the tank as required. A well 18 and a ladder 19 are for convenience in reaching certain parts of the tank 17 and other apparatus.

The method of agitating the heavier liquid in the bottom of the treating tank 17 by means of the steam pipe with outlet ports projecting in a forward direction, has the effect to rotate the liquid and thereby to provide a thorough mingling of the contents or ingredients of the heavier liquid.

As indicated in Fig. 3 a flared nozzle 31 is suitably suspended within the tank 17 from a pipe 32 through which is supplied from the container 4, the lighter liquid as creosote, for instance, for delivery through said nozzle upon the heavier liquid previously placed in said tank, in order to provide, as before stated, for the delivery of the lighter liquid gently or readily upon said heavier liquid for the purpose above indicated. The pipe 32 is pivotally mounted in the wall of the treating tank as shown clearly in Figs. 3 and 4, and a lever 34 having one end fixedly secured thereto at 34' serves to provide means for raising and lowering the nozzle 31 to the desired altitude. The lever is provided with a latch 35 which coöperates with a toothed segment 36 to allow for retaining the lever in adjusted position. The nozzle 31 is pivotally mounted on the delivery end of the pipe 32 and pivotally connected to one end of a rod 33 which has its opposite end pivotally mounted to the tank wall at 33'. This rod 33 operates to automatically maintain the mouth or opening of the nozzle in a horizontal position, as the pipe 32 is elevated or depressed, to flow the liquid to better advantage.

Suitably positioned upon the tank 17 within the well, alongside thereof, is a transparently faced gage 37 for ascertaining the depth or height of the liquid within the tank, by the operator, and further for viewing the levels of the different liquids therein. The gage 37 may be constructed in any suitable manner, preferably, however, as disclosed by Figs. 6, 7, 8, and 9. Preferably this gage or structure comprises a metal frame 31ª to which is fitted a wired glass plate 32ª with proper gaskets 33ª and a retaining member 34ª screwed into said frame. Upon the inner portion of the frame at 35ª are guideways and in the guideways is a runner 36ª supporting a scraper 37ª for cleaning the interior of the glass plate 32ª. As preservative liquids are very often black or brown and rather of a heavy consistency, it is necessary to wipe off the glass surface so that a perfect reading may be taken of the elevation of the several liquid contents. This is provided for by means of the scraper which may be of rubber or like substance and which acts as a squeegee to remove any of the preservative that may stick to the glass which would prevent an inaccurate reading of the elevation of the several contents of the tank. In order to pass the squeegee over the glass plate, a small rod with a hook at one end thereof may be inserted into the opening 38 and a purchase secured upon the carriage 36ª to effectually remove any adhering substance. In order to render the gage or structure doubly safe and to prevent the loss of the liquid in case of the breakage of the glass, a substantial tight door 39 is provided on the outside of the tank wall, the same being suitably provided with gaskets 40 to seal the opening. Lever latch members 41 and 42 serve to hold the door tightly closed.

Having thus described my invention, what I claim and desire to secure by Letters Patent, is:—

1. In an apparatus for impregnating timbers, a treating tank, a supply pipe communicating therewith, a delivery pipe connected to the latter and disposed within the tank, means for raising and lowering the outlet of the delivery pipe, and a delivery nozzle adjustably mounted upon the delivery pipe.

2. In an apparatus for impregnating timbers, the combination of a treating tank adapted to contain a treating fluid or liquid supported upon a liquid of greater specific gravity, supply pipes communicating with said treating tank, connecting pipes establishing connection between said supply pipes, means for forcing and circulating said supported liquid through said pipes and said tank, and a plurality of vertically adjustable liquid conveying devices connected to said supply pipes and disposed within said tank.

3. In an apparatus for impregnating timber, a treating tank, a supply pipe communicating therewith, a pivotally mounted liquid flowing device connected to the latter and disposed within the tank, and means for raising and lowering the outlet or mouth of said device said means consisting of an adjustable lever fixedly secured to said device and means for retaining said lever in adjusted position.

4. In an apparatus for impregnating timber, a treating tank, a supply pipe communicating therewith, and vertically adjustable means for delivering liquid from the pipe to the tank said means consisting of a pipe connected to the supply pipe and pivotally mounted in the wall of the tank and extending into the tank, a delivery nozzle adjustably mounted upon the end of the pipe, and a rod having one end pivotally secured to said nozzle and the opposite end pivotally secured to the wall of the tank.

5. In an apparatus for impregnating timbers, the combination of a treating tank adapted to contain a treating fluid or liquid supported upon a liquid of greater specific gravity, supply and discharge pipes communicating with the upper part of said treating tank, connecting pipes adapted to establish connection between said pipes, and means for forcing and circulating said supported liquid through said pipes and said tank.

In testimony whereof I affix my signature.

EDWARD A. LINDSLEY.